United States Patent
Klemm (10) Patent No.: US 9,503,575 B2
(45) Date of Patent: Nov. 22, 2016

(54) METHOD AND APPARATUS FOR AUGMENTING COMMUNICATION SESSIONS USING CONTEXTUAL INFORMATION

(71) Applicant: Avaya Inc., Santa Clara, CA (US)

(72) Inventor: Reinhard Klemm, Basking Ridge, NJ (US)

(73) Assignee: Avaya, Inc., Basking Ridge, NJ (US)

( * ) Notice: Subject to any disclaimer, the term of this patent is extended or adjusted under 35 U.S.C. 154(b) by 0 days.

(21) Appl. No.: 14/318,376

(22) Filed: Jun. 27, 2014

(65) Prior Publication Data

US 2015/0381803 A1    Dec. 31, 2015

(51) Int. Cl.
*H04M 3/42* (2006.01)
*H04M 3/428* (2006.01)
*G06Q 50/00* (2012.01)

(52) U.S. Cl.
CPC ......... *H04M 3/4285* (2013.01); *G06Q 50/01* (2013.01); *H04M 3/4211* (2013.01); *H04M 3/42068* (2013.01)

(58) Field of Classification Search
CPC .... H04W 4/12; H04W 4/02; H04M 3/42042

USPC ........................ 455/412.1, 412.2, 414.1, 415
See application file for complete search history.

(56) References Cited

U.S. PATENT DOCUMENTS

2010/0049627 A1* 2/2010 Geppert et al. ................. 705/27

* cited by examiner

*Primary Examiner* — Sam Bhattacharya (57) ABSTRACT

Systems and methods for establishing and conducting communication sessions augmented by contextual information. A call originator initiates a request to establish a communication session. The endpoint furnishes information identifying the call originator and intended call recipient(s). The method receives the request from the call originator and retrieves contextual information relating the call originator to the intended call recipient. If no contextual information has yet been derived, the contextual information is generated from data attributes available from one or more social networking sites. In some embodiments, the method generates the contextual information according to a set of rules and, if applicable, user preferences. The method handles the call request based on at least one of a set of rules, user preferences, and scheduling input received from the intended recipient responsive to receipt of the contextual information. The contextual information is accessible to some or all participants before and during the communication session.

20 Claims, 9 Drawing Sheets

| SOCIAL NETWORK DATA ATTRIBUTES 204 | 206 | 202 |
|---|---|---|
| PERSONAL | PROFESSIONAL | POSTING ACTIVITY (INTERACTIONS) |
| FRIENDS | COLLEAGUES | SENTIMENTS ABOUT A BUSINESS |
| HOBBIES | EDUCATION | ATTITUDES ABOUT AN INSTITUTION |
| HOMETOWN | CURRENT EMPLOYER | ATTENTON TO CURRENT EVENTS |
| CURRENT RESIDENCE | PRIOR EMPLOYER(S) | INVOLVEMENT IN COMMUNITY AFFAIRS |
| PAST RESIDENCE(S) | CURRENT SUPERVISOR | WORK/LIFE BALANCE |
| PRIMARY EDUCATION | PRIOR SUPERVISOR | SOCIAL CALENDAR |
| SECONDARY EDUCATION | FORMER COLLEAGUES | UPCOMING EVENTS |
| SPOUSE'S NAME | JOB TITLE | SPORTS EVENT ATTENDANCE |
| BIRTHDATE | FORMER JOB TITLE | PUBLIC AWARDS RECOGNITION |
| WEDDING ANNIVERSARY | SKILLS & EXPERTISE | MAJOR PURCHASES |
| MARITAL STATUS | COLLEGE DEGREE(S) AND ATTENDANCE | |
| | WORK ANNIVERARY | |

METHOD AND APPARATUS FOR AUGMENTING COMMUNICATION SESSIONS USING CONTEXTUAL INFORMATION

BACKGROUND OF THE INVENTION

1. Field of the Invention

Embodiments of the present invention generally relate to establishing communications sessions between two or more participants and, more particularly, to methods and systems configured to access information relating to at least one of the participants as part of a call set up process.

2. Description of the Related Art

Processing communications, such as telephone calls, according to a call flow based, at least in part, on the identity of the person initiating the communication, is a common practice today. In a very basic example, information (e.g., "CallerID" data) identifying a party call originator is transmitted by a central office, PBX, or voice over internet protocol (VoIP) server, as part of a call setup invitation, to a communication terminal endpoint associated with an intended recipient. The embedded CallerID information is extracted and used to display the name and telephone number of the call originator.

In addition to CallerID, however, a substantial volume of information may be available about a community of individuals who might wish to establish communication sessions amongst themselves. Public sources such as the World Wide Web (Internet), as well as a variety of social networks in which users of a communication system may be active, provide a rich variety of data of potential use to both the call originator and the intended call recipient, alike.

A continuing need, however, exists for systems and methods providing participants in a call (or those invited to participate in a call) with meaningful insights derived from information available from one or more public data sources. Presenting participants in a communication session with the overwhelming volume of data publicly available about a call originator or a call recipient, however, has a very low probability of being useful to any party. Accordingly, there exists a further need for a way to access, analyze, and use the aforementioned data to set up communication sessions between participants and to augment any communication sessions so established.

SUMMARY OF THE INVENTION

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method for setting up and augmenting communication sessions using contextual information available from one or more social media sources is described. According to embodiments, a call originator executing a client communication application on a communication endpoint initiates a request to establish a communication session with one or more intended recipients. In an embodiment, the endpoint furnishes information uniquely identifying the call originator and an intended call recipient. The method receives the request from the call originator and retrieves contextual information relating the call originator to the intended call recipient. If the method determines that no contextual information has yet been derived, the method generates contextual information from data attributes available from one or more social networking sites, as well as other accessible data sources. In some embodiments, the method generates the contextual information according to a set of rules and, if applicable, user preferences. The method handles the call request based on at least one of a set of rules, user preferences, and scheduling input received from the intended recipient responsive to receipt of the contextual information.

In some embodiments, the method makes the contextual information available to one or both members of a call originator-call recipient pair, as part of a default call handling process. According to user preferences, the order in which data attributes comprising the contextual information are presented to a user is set by user preference. Other user preferences can include the default language in which the contextual information is presented. In other embodiments, the contextual information is analyzed according to a set of user call handling preferences such, for example, as prioritizing calls (immediate transfer according to the presence of certain common attributes, immediate invitation to leave a message, and rejecting calls according to the absence of certain or any common attributes).

In some embodiments, the method retrieves the data attributes from a plurality of social network sites and stores them in a data repository. The method generates contextual information comprising discrete contextual elements by relating pairs of individuals. The contextual data elements are generated either on-demand, a priori, or a combination of these. In embodiments, the method analyzes the data attributes to identify those attributes an originator-recipient pair has in common ("intersections"). The method further identifies, in embodiments, data objects containing no data attributes in common between members of an originator-recipient pair ("differences"). Each expression of a commonality or difference constitutes a discrete contextual data element.

According to one or more embodiments, intersections and differences are additionally computed on a relative scale rather than as absolute values (e.g., as "degrees of intersection" and "degrees of difference" with respect to an attribute or set of attributes). Furthermore, the intersection and difference analysis extends, in some embodiments, to the personal connections of the call originator and recipient on social networks. As part of the intersection and differences analysis, data attributes and personal relationships can be pre-identified as "common" or "opposites", wherein detection of commons and opposites triggers display to the endpoint of a call recipient, a call originator, or both.

According to some embodiments, a data repository containing contextual information in the form of pre-computed contextual data elements is associated with a social networking site, wherein the contextual information is generated, on demand or a priori, at the social networking site and furnished to the call originator and call recipient endpoints for processing according to one or more embodiments. The intended call recipient executes the client communication application on a communication endpoint. The method initiates display of at least some of the retrieved contextual data elements to the display of the call recipient's endpoint. According to some embodiments, the method processes call handling input entered by the intended recipient at the communication endpoint of the intended recipient. The input includes, in an embodiment, an instruction to drop the call after playing an invitation for the call originator to enter a voice messaging process, an instruction to play a continue to hold message, an instruction to forward the call to a different recipient, an instruction confirming a time and date of a scheduled call, an instruction to terminate the call, and an instruction to accept the call.

In some embodiments, call originators and recipients control the release of contextual data elements to other call participants. In an embodiment, one or more attributes are excluded from use by the contextual information generator. In another embodiment, the attributes are tagged such that they are accessible to the contextual information generator but the resulting contextual information element identified by reference to the tagged attribute is subject to user-defined access restrictions, exclusions, or other preferences. Thus, the user preferences determine what contextual information elements are released to other call participants. According to such user-determined preferences, control is either configured for all or for multiple calls, and it can be overridden for a given call.

In one embodiment, a user is prompted during a setup and configuration step preceding the generation of contextual information to complement the data attributes automatically retrieved from social networks and other online and offline data sources. As part of the set up and configuration step, the user supplies personal characteristics or attributes that the user would like to share with some or all other call recipients in future calls. Some or all of the complementary attributes, which can include identification of speech impediments, multi-lingual ability, local time zone, professional excellence awards, and the like, may not be accessible through a pre-configured automated retrieval process.

In another embodiment, an apparatus for setting up and augmenting communication sessions using contextual information available from one or more social media sources is described. The apparatus includes a computer having one or more processors and further comprising a call processor, a contextual information generator, a call session scheduler, and a data repository containing attributes available from one or more social networking sites.

In yet another embodiment, a computer readable medium for setting up and augmenting communication sessions using contextual information available from one or more social media sources is described is described. The computer readable medium stores computer instructions that, when executed by at least one processor causes the at least one processor to perform a method for setting up and augmenting communication sessions using contextual information available from one or more social media sources.

While the method and apparatus is described herein by way of example for several embodiments and illustrative drawings, those skilled in the art will recognize that the method and apparatus for ordering images in an image set based on social interactions and viewer preferences is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for ordering images in an image set based on social interactions and viewer preferences defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Techniques are disclosed for establishing and augmenting communication sessions between a call originator and call recipient. In embodiments, a caller initiates a request to set up a communication session with a called party by launching a client application installed on a Smartphone, desktop computer or other communication terminal. In other embodiments, the caller initiates a request by invoking a Web (browser-based) application on such a communication terminal. The application is configured to retrieve a number of data attributes related to, owned by, or contributed by the caller from a set of configured and, typically, public social network sites. Examples of the latter include Face book, LinkedIn, Google+, Twitter, Xing, etc. The attributes include personal and professional profile items, social interactions (e.g., message "posts"), "follow"/"like" relationships, and the like. According to embodiments, the caller grants permission to the application to retrieve the items on a call-by-call basis, or on a persistent basis (i.e., "once and for all").

In some embodiments, a request to establish a communication session with an intended recipient is received and processed by a server. The server processes and schedules the call requests based on a set of rules and preferences associated with prospective call recipient. As part of a call scheduling process, the server accesses and retrieves social network data attributes from one or more data repositories. In some embodiments, each data repository forms part of a social network and access credentials are furnished by the server to a social network site on behalf of at least one of the call originator and the call recipient. The access credentials can include a unique social network site identifier associated with each prospective caller or call recipient, or a device token uniquely associated with a client application identifier (ClientaI) and user identifier (UserID) of a particular communication terminal.

According to embodiments, retrieved social network data attributes corresponding to the call originator and, optionally, the call recipient, are evaluated by a call scheduling module and processed according to a set of rules and user preferences. An example of a call setup rule includes a prescribed sequence for processing call set up requests on behalf of a particular recipient. According to one prescribed sequence, a call originator is placed on hold, a message is played for the call originator, and a call request notification is transmitted to the intended recipient. The notification is sent, according to embodiments, via an SMS message, an e-mail, or as a session initiation protocol (SIP) invitation. In an embodiment, a client communication application executes on one or more destination endpoints associated with the intended recipient. Upon receipt of the notification, a user interface of the client communication application enables the intended recipient to access retrieved social network data attributes and to provide input to the server determining which overrides any default call treatment which might otherwise apply.

A further example of a call setup rule includes a default call treatment defining a prescribed sequence for processing call set up requests on behalf of a particular recipient. According to one prescribed sequence, a call originator is placed on hold, a message is played for the call originator, and a call request notification is transmitted to the intended recipient. The notification is sent, according to embodiments, via an SMS message, an e-mail, or as a session initiation protocol (SIP) invitation. In an embodiment, a client communication application executes on one or more destination endpoints associated with the intended recipient.

The present invention may be a feature of a social network hosted or augmented communication server, with communication client applications executing on endpoint terminals being used to identify intersecting, as well as non-overlapping, areas of session participant backgrounds, skills, expertise, education, social sensitivities, and the like according to user preferences. Advantageously, the present invention enables endpoint users to create and enforce rules for call treatment based on information available from one or more social networks. As well, one or both participates in a communication session have access to such information during the call. As a result, the participant is able to fully capitalize on his or her interactions and conduct business activities with greater efficiency.

Various embodiments of a method and apparatus for ordering images in an image set based on social interactions and viewer preferences are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
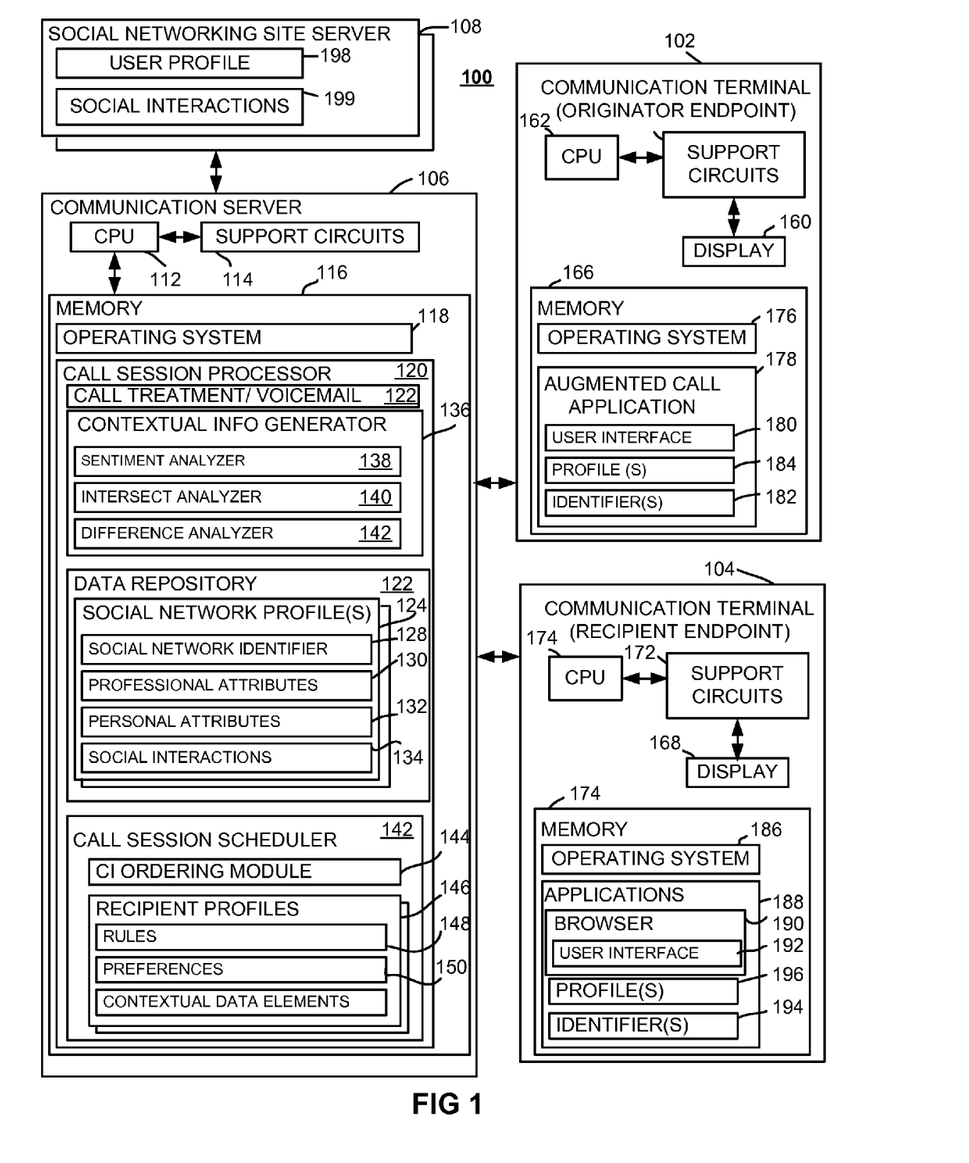
FIG. 1 is a block diagram of a system for augmenting communication sessions using contextual information extracted from one or more social media sources, according to one or more embodiments.

FIG. 1 is a block diagram of a system 100 for establishing and augmenting communication sessions between a call originator endpoint 102 and a call recipient endpoint 104 according to one or more embodiments. The system 100 includes a server 106, one or more social networking site servers, collectively referred to as social networking site server 108, and an augmented client application 110 configured for execution on each of endpoints 102 and 104. The server 106 is a computing device, for example a desktop computer, laptop, tablet computer, and the like or the server 106 may be a cloud based server e.g., a blade server, virtual machine, and the like. The server 106 includes a Central Processing Unit (CPU) 112, support circuits 114, and a memory 116. The CPU 112 may include one or more commercially available microprocessors or microcontrollers that facilitate data processing and storage. The various support circuits 114 facilitate the operation of the CPU 112 and include one or more clock circuits, power supplies, cache, input/output circuits, and the like. The memory 116 includes at least one of Read Only Memory (ROM), Random Access Memory (RAM), disk drive storage, optical storage, removable storage and/or the like.

The memory 116 includes an operating system 118, and a session set up request processing module 120 including call session handler 122 and a data repository 124 containing data attributes available from social networking server 108. The data attributes are organized within user social network profiles 126 and include one or more unique social network identifiers 128, each associating a user with a corresponding social networking site, professional attributes 130, personal attributes 132, and social interactions 134.

Session request processor 120 further includes a contextual information generator 136, which includes a sentiment analyzer 138, an intersect analyzer, and an difference analyzer 140. Session request processor 120 further includes a call session scheduler 142, which includes a contextual information ordering module 144, and a plurality of recipient profiles 146. In some embodiments, a recipient user profile 146 includes pre-generated contextual information. Contextual information, for example, may have been previously generated in furtherance of a prior communication mediated by server 106. Alternatively, the contextual information may have been generated as part of an overall contextual information pre-population process during which contextual information relating each user to every other user was developed for prospective use. Recipient user profiles 146 further include rules 148 and preferences 150, each of which make reference to the contextual information as inputs to call session handler 122.

The operating system 118 may include various commercially known operating systems.

Each of user communication endpoints or devices 102 and 104 is a computing device, for example a desktop computer, laptop, tablet computer, smartphone, and the like that includes or is connected to a display. The user device 102, for example, includes a display 160, Central Processing Unit (CPU) 162, support circuits 164, and a memory 166. Likewise, user device 104 includes a display 168, Central Processing Unit (CPU) 170, support circuits 172, and a memory 174.

CPU 162 includes one or more commercially available microprocessors or microcontrollers that facilitate data processing and storage. The various support circuits 164 facilitate the operation of CPU 162 and include one or more clock circuits, power supplies, cache, input/output circuits, and the like. The memory 166 includes at least one of Read Only Memory (ROM), Random Access Memory (RAM), disk drive storage, optical storage, removable storage and/or the like. The memory 166 includes an operating system 176 that provides a computing foundation for software modules of the user device 102. The memory 166 includes applications including an augmented client communication application 178 providing a user interface 180, a unique identifier 182 associated with endpoint device 102 or the user of endpoint device 102 and, optionally, one or more locally stored profiles 184 containing previously generated contextual information associating the user of endpoint device 102 with users of one or more other endpoint devices.

Similarly, CPU 170 of device 104 includes one or more commercially available microprocessors or microcontrollers that facilitate data processing and storage. The various support circuits 172 facilitate the operation of CPU 170 and include one or more clock circuits, power supplies, cache, input/output circuits, and the like. The memory 174 includes at least one of Read Only Memory (ROM), Random Access Memory (RAM), disk drive storage, optical storage, removable storage and/or the like. The memory 174 includes an operating system 186 that provides a computing foundation for software modules of the user device 104. The memory 174 includes applications 188 which, in some embodiments, include the augmented client communication application 178 installed on the device 102. However, in the illustrated embodiment depicted in FIG. 1, memory 174 includes one or more commercially available browsers 190 that allow endpoint 104 to invoke a functions of server 106 to display user interface 192, access centrally stored contextual information relating the user of endpoint device 104 to users of other endpoint devices. Browser 190 is also configured to utilize a locally stored unique user identifier 194 and locally stored user profiles 196 when invoking functions of server 106 to set up or handle a call origination request for the user of endpoint device 104.

Figure 2:
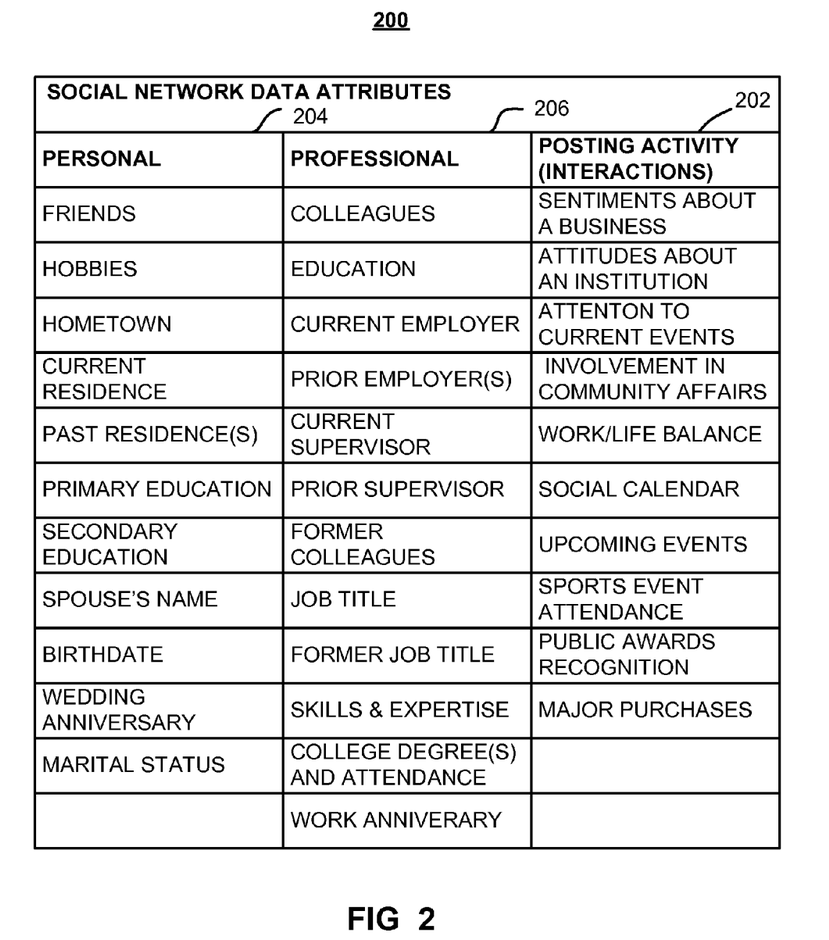
FIG. 2 is a tabular representation of data attributes available from one or more social network sites and utilized by a contextual information generator according to one or more embodiments.

The social networking site server 108 is host to a social networking site, for example, FACEBOOK, LINKEDIN, TWITTER, BEHANCE, and the like. The social networking site server 108 manages subscriber profiles 198, which can contain user credentials (e.g., usernames and passwords or access tokens) used to control access to personal and professional data attributes and other resources furnished by, collected from, or associated with users of a social networking site. Each social network server further managers social interactions 199, which include the posting activity, "follows", and "likes"/"dislikes" of the social network subscribers. In FIG. 2, there is shown a tabular representation 200 of exemplary data objects derived from social networking interactions 202, and also including personal data attributes 204 and professional data attributes 206 available from social networking sites.

As used herein, social interactions 199 include any form of social engagement. In one embodiment, social interactions 199 include content, such as messages posted to a social network, which a user or potential user of augmented communication services has tagged with a follow or like. In another embodiment, social interactions 199 include stored comments contributed by a subscriber. In yet another embodiment, social interactions 199 include likes, dislikes and follow activity, as well as stored user comments.

The network 108 includes a communication system that connects computers (or devices) by wire, cable, fiber optic and/or wireless link facilitated by various types of well-known network elements, such as hubs, switches, routers, and the like. The network 108 may be a part of the Intranet using various communications infrastructure, such as Ethernet, Wi-Fi, a personal area network (PAN), a wireless PAN, Bluetooth, Near field communication, and the like.

A user of endpoint device 102 logs into the server 106 via the locally installed communication application 178. The viewer accesses the user interface 180 in order to initiate a communication session request with an intended recipient. Alternatively, as previously noted, the user interface may be invoked using a browser executing on the endpoint device. The request includes unique identifiers which may be used to determine the identity of the call originator using endpoint 102 and the intended call recipient using, in an example, endpoint 104. The call treatment handler 122 of session request processor 120 is configured to receive the request and to identify the call originator and intended call recipient.

According to some embodiments, call treatment handler 22 is further configured to determine whether any existing contextual information is available relating the call originator to the call recipient. According to rules 150 specified in call scheduler 142, treatment handler 122 completes the call or notifies the call originator that his request is being placed on hold momentarily, depending on whether the recipient user profile specifies augmented call processing according to embodiments. In SIP-enabled phone client embodiments, the notification may include an audible hold message including periodic updates on wait time. While the call originator is on hold, contextual information is retrieved from a data repository forming, for example, a component of the recipient profile 146. A notification is also sent to the intended recipient. Upon receiving the notification, the endpoint device used by the intended recipient, as endpoint device 104, invokes an augmented user interface via, for example, browser 192 or a separate locally installed instantiation of communication application 178.

In some embodiments, rules 150 specify a dynamically variable hold time and corresponding hold time estimates according to a volume of contextual information available for presentation to the intended call recipient, or actually presented to the intended call recipient, as part of the specified augmented call processing. If no contextual information has yet been generated for a call originator-call recipient pair, data attributes pertaining to both are retrieved, by contextual information generator 136, from the social network profiles 126 residing in data repository 124.

Sentiment analyzer 138 analyzes the content of messages for certain key words and phrases, to classify messages based on expressed sentiments such as feelings about a business, industry, current events, and the like. Other attributes derived from social interactions 199 include community involvement, major purchases, social activities in which a party participated or plans to participate, and the like. Examples of attributes 202 derived from social network interactions are exemplified by FIG. 2. Attributes derived from social network interactions 199, user profile 198, publicly available sources such as the internet, and any profiles furnished directly to server 106 as part of a registration process or ongoing profile administration, are processed independently and in parallel by intersect analyzer 140 and difference analyzer 142.

The intersect analyzer 140 determines commonalities between data attributes associated with the call originator and the intended recipient. These include, as exemplified by FIG. 2, common relationships (shared friends, acquaintances, and colleagues), background, interests, skills, expertise, past employers, education history, hometown, and other items of mutual interest which might be used as "touch points" during an initial or subsequent communication between two participants in a communication session. Each expression of a commonality, such as "you both vacationed at Aspen, Colorado" last year constitutes a discrete contextual data element.

The difference analyzer 142, identifies data objects (which consist of one or more groupings of data attributes) which contain no overlap). If, for example, the call originator is in one time zone, and the intended recipient is in another time zone, this difference represents a further contextual element that can generated, stored, retrieved, and presented to call participants according to one or more embodiments.

In some embodiments, intersections and differences are additionally computed by intersect analyzer 140 and difference analyzer, respectively, on a relative scale rather than as absolute values (e.g., as "degrees of intersection" and "degrees of difference" with respect to an attribute or set of attributes). In an embodiment, relative scale computations are performed using a distance function for each attribute. As contextual data elements, a graphical representation depicting a relative distance between the same attribute for a pair of prospective call participants would be readily appreciated at a glance. Consider the following examples:

for an "age" attribute, the distance is the difference of two ages for a "work location" or "home location" the distance can be the actual linear distance, in miles or km, between two locations for a "mood" attribute, characterized by such values as "grumpy", "happy", "neutral", "sad", and "ecstatic", a distance may be defined between any of these, wherein the difference between "sad" and "ecstatic" would be greatest distance and the difference between "happy" and "ecstatic" would be relatively smaller for an "interests" attribute, characterized by such values as "classic music concerts", "candlelight dinners", "dirt bike racing", "skydiving" and "hang gliding", the distance between "skydiving" and "hang gliding" would be considerably smaller Furthermore, the intersection and difference analysis extends, in some embodiments, to the personal connections of the call originator and recipient on social networks. As part of the intersection and differences analysis, data attributes and personal relationships can be pre-identified as "common" or "opposites", wherein detection of commons and opposites triggers display to the endpoint of a call recipient, a call originator, or both.

As further examples of generating contextual data elements from available data attributes, a data object "EDUCATION" might include, as data attributes, the names of the primary school, secondary school, and post-secondary schools which each participant or potential participant attended. Accordingly, embodiments of intersect generator 140 are configured to generate the expression; "you both attended X High School" is an example of an "education" contextual data element given the existence of attributes to this effect in data repository 122. Likewise, the data object "HOBBIES" might include, as data attributes, the names of each leisure activity engaged in by the participants as for example, fishing, hunting, playing tennis, hiking, bird-watching, and jogging. Accordingly, embodiments of intersect generator 140 are configured to generate the expression, "you both enjoy bird-watching" as a contextual data element given the existence of attributes to this effect in data repository 122.

As still further examples, the data object "COMMUNITY ACTIVITIES" might include, as data attributes, the charities in which the participants are active, their place of worship (or definitive lack thereof), role(s) as a volunteer such as firefighting" and the like. Here, embodiments of difference generator 142 are configured to generate the expression, "you have both been volunteer firefighters" as a contextual data element given the existence of attributes to this effect in data repository 122.

As yet another example, the data object "EMPLOYMENT HISTORY" might include, as data attributes, the names of each former employer, former supervisor, former colleague, and job title. Some or all of the above data attributes may have been derived from one or more social network data repositories, or contributed as user profiles by the participants themselves. It suffices to say that given any pair of potential parties to a communication session for whom access to a collection of data objects and attributes is provided, the intersect analyzer 140 and the difference analyzer 142 are configured, respectively, to perform the complementary tasks of identify those data attributes the pair have in common and identifying those data objects which have no overlap whatsoever. In an embodiment, the difference analyzer 142 is further responsive to input from the sentiment analyzer 138 to identify those subjects about which the participants have opposing views.

Once generated, the contextual data elements are stored and made available for subsequent retrieval in support of future communication sessions. They may be stored in data repository 122 or in separate call recipient profiles. In some embodiments, call originators and recipients control the release of contextual data elements to other call participants. In an embodiment, one or more attributes are tagged, using a personal settings window of client application program 178 or browser application 188, as being excluded from use by the contextual information generator. In another embodiment, the attributes are tagged such that they are accessible to the contextual information generator (permitting one-way access) but the resulting contextual information element identified by reference to the tagged attribute is subject to user-defined access restrictions, exclusions, or other preferences. Thus, the user preferences can determine what contextual information elements are released to other call participants. According to such user-determined preferences, control is either configured for all or for multiple calls, and it can be overridden for a given call.

Figure 3:
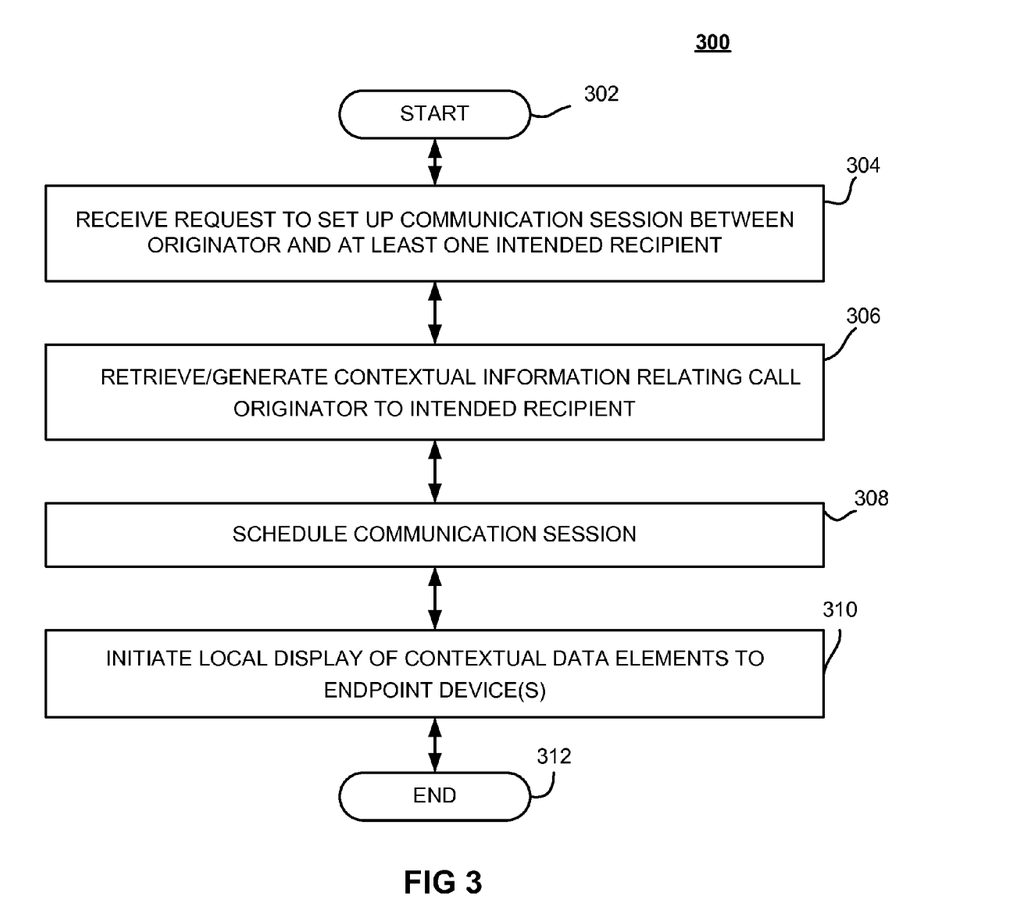
FIG. 3 is a flow diagram depicting a method for augmenting communication sessions using contextual information extracted from one or more social media sources as performed by the communication request processor of FIG. 1, according to one or more embodiments.

FIG. 3 is a flow diagram depicting a method 300 for augmenting communication sessions using contextual information extracted from one or more social media sources as performed by the communication request processor of FIG. 1, according to one or more embodiments. The method 300 utilizes contextual information to affect call treatment between two communication endpoint devices and to provide one or more participants in a communication session with an organized interface assessing useful and relevant information relating the participants to one another. The method 300 starts at step 302 and proceeds to step 304.

At step 304, the method 300 receives a request to set up a communication session between a call originator and an intended recipient. The request may be from a user of a communication endpoint especially adapted for telephone communications and having an application configured for peer-to-peer connectivity with a similarly equipped second user. Alternatively, the request may be from a user of a communication endpoint executing a communication client which is configured to sign on to a server by supplying user authentication credentials (e.g., an email address and password).

The method 300 proceeds to step 306, where the method 300 retrieves contextual information relating the call originator to the intended recipient. In some peer-to-peer embodiments, the method utilizes unique identifiers relating to both call originating user and the intended recipient in an authentication and authorization process which culminates in the retrieval of the contextual information from a data repository.

The method 300 proceeds to step 308, where the method 300 schedules a communication between the call originator and a call recipient according to a set of rules and user preferences. Examples of rules include whether or not augmented processing based on contextual information is to be performed at all and, if so, how will the call be treated. According to embodiments, one rule may specify that a variable hold time, giving the intended recipient an amount of time to review retrieved or generated contextual information which varies dynamically according to the volume of data as measured in bytes or characters. According to another, a timeout may be specified wherein the call originator is invited to leave a message or subjected to call drop treatment if the intended recipient does not respond to a setup notification within a predetermined time, or invokes a feature button manifesting a desire to reject the call invitation.

The method 300 proceeds to step 310, where the local display of one or both communication endpoints are caused to display contextual information generated and retrieved, or simply retrieved, at step 308. In addition to an intended recipient referring to the displayed contextual information during a call setup phase (i.e., when considering whether or not to accept a call invitation), the information is available to one or both participants for the duration of the call. The method 300 proceeds to step 312 and ends.

Figure 4:
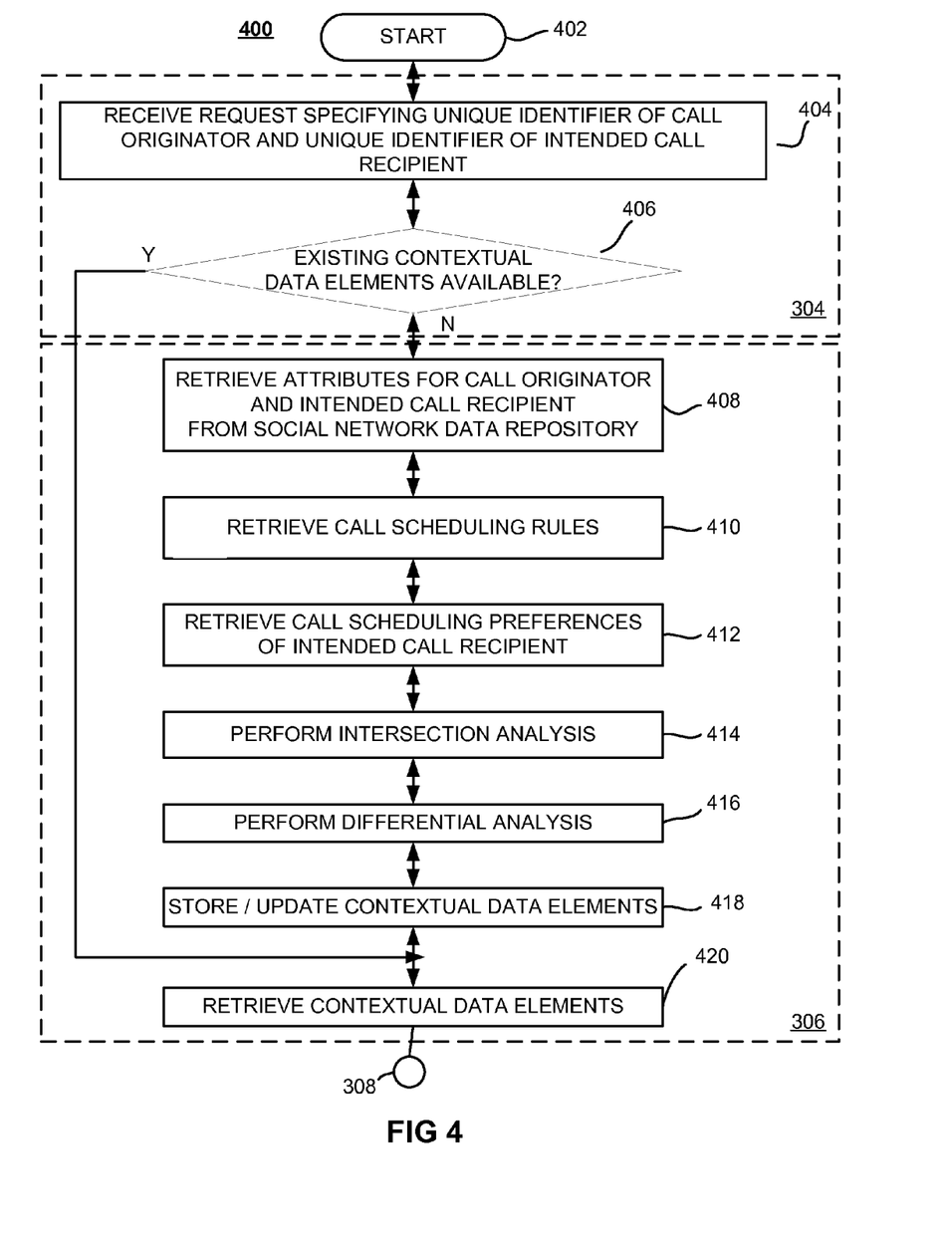
FIG. 4 is a flow diagram depicting further details of a method for augmenting communication sessions using contextual information extracted from one or more social media sources, as performed by the communication request processor of FIG. 1, according to one or more embodiments.

FIG. 4 is a flow diagram depicting further details of a method 400 for augmenting communication sessions using contextual information extracted from one or more social media sources, as performed by the communication request processor of FIG. 1, according to one or more embodiments. The method 400 is entered at step 402 and proceeds to step 404, where the method receives a request specifying a unique identifier of a call originator and a unique identifier of an intended call recipient. The process proceeds to determination step 406, where it is determined whether existing contextual information is already available for the call originator—call recipient pair identified in the request received at step 404. If not, the method retrieves data attributes for the call originator and recipient from a data repository at step 408. The process then advances to step 410

At step 410, call scheduling rules are retrieved, for example, from the user profile of the intended recipient. Such rules specify call treatment based, for example, on the identity of the call originator and the manner in which custom call treatment using contextual information is to be supported for a particular recipient. By way of example, a user may require enforcement of a rule that all received call invitations are to be placed on hold for a fixed duration, regardless of the volume of information available. Alternatively, the user may require enforcement of a rule that all call invitations are to be placed on hold for a dynamically variable period, calculated based on the volume of available data measured in bytes, characters, identified data objects in common, identified data attributes in common, or a number of pages required to view all available contextual information.

At step 412, the method 400 retrieves call scheduling preferences of the intended call recipient. Such rules enable the user recipient to specify different call scheduling and handling treatment for certain call originators as compared to others. For example, according to some embodiments a user may specify a preference that all members of the same fraternity be provided with a customized message, and hold time, that a minimalist set of data attributes to be utilized when performing intersect analysis for this group, and that no data attributes be utilized when performing difference analysis for this group. Conversely, a user recipient may specify that a call from a person working for a particular employer, representing a "hot" sales prospect, and that the call be immediately set up (i.e. without delay or hold call treatment). In the latter example, the user may specify a default preference for a full contextual profile be generated or retrieved each time a user calls, but in the case of immediate call set up processing, permit a notification of "full contextual information report" notification be "pushed" separately to the call recipient or "pulled" separately by the call recipient. In each such case, the availability notification and underlying contextual information would be supplied independently of the actual call setup) as soon as they are available, thereby minimizing any chance of the call originator prematurely terminating the session and taking his or her business elsewhere.

The method performs intersection analysis at step 414, and differential analysis at step 416. In each case, the analysis is guided by any user preferences so that no data objects deemed extraneous to the call recipient are included. To the extent a call recipient and call originator may have different preferences as prospective recipients, these differences are addressed by simultaneously deriving a respective profile for each user, with each profile containing contextual information expressing data attributes in terms of commonalities and differences. At step 418, the method stores the contextual information, generated by intersection and difference analyses, in the corresponding user profile(s). The process then proceeds to step 420.

According to some embodiments, the method determines at step 406 that at least some contextual information relating two parties to a communication session already exists. According to some embodiments, especially those in which communication services are hosted by a server administered by a social networking site which has access to its own proprietary data attribute repository, intersections and differences are identified a priori. As a result, the contextual information is already available when a call originator, already a member of the hosting social network's user community, initiates a request to set up a call with a call recipient who is also already a member of the hosting social network's community.

At step 420, the contextual information—whether pre-existing, recently supplemented, or newly generated—is retrieved and the process returns to step 308 of method 300.

Figure 5:
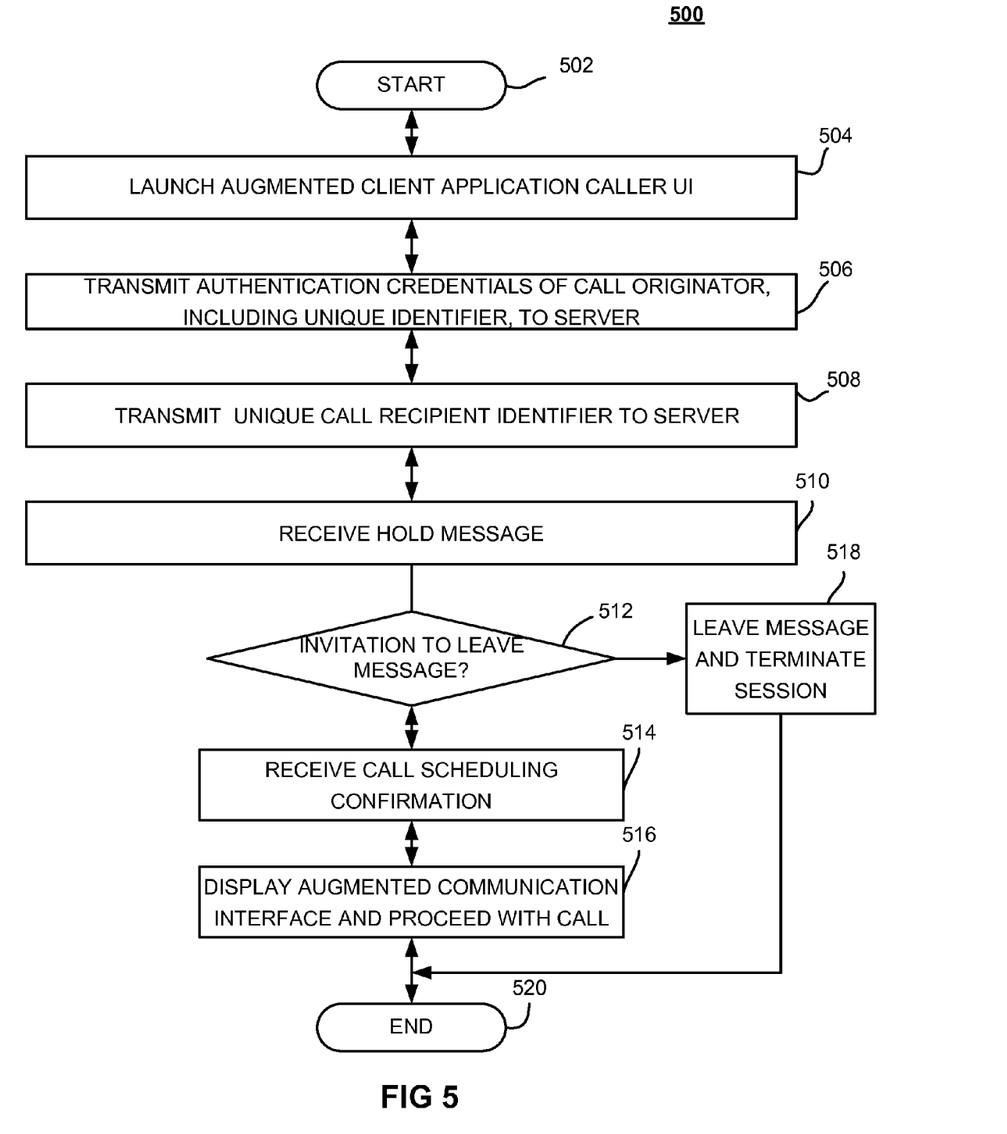
FIG. 5 is a flow diagram depicting the origination and set up of a communication session using a communication endpoint, according to one or more embodiments.

FIG. 5 is a flow diagram depicting a method 500 for the origination and set up of a communication session using a communication endpoint, according to one or more embodiments. The method 500 is started at step 502 and proceeds to step 504 where a locally installed, augmented client communication application is launched, or a browser is opened invoking the functions of the augmented communication application hosted by a server. The method proceeds to step 506, where the method transmits, to a server, the authentication credentials or a unique identifier of a call originator. Method 500 then proceeds to step 508, where a unique call recipient identifier, which may be a telephone number, internet protocol (IP) address, e-mail address, or the like, is also transmitted to the server. The process proceeds to step 510.

At step 510, the method receives a hold message indicative of augmented call processing by the server according to one or more embodiments. At step 512, the method determines whether, as part of the augmented call processing, an invitation to leave a message is being received. If so, the method reproduces voice prompts to the call originator, displays a feature button enabling the call originator to terminate the communication session or, at step 518, the method actuates a microphone associated with the call originating endpoint and captures and stores the voice message. In such event, the process terminates at step 520.

If on the other hand, at step 512, that no invitation to leave a message has been received and that a call between originator and recipient is to be started, method 500 proceeds to step 514 and receives a call scheduling confirmation 514. In some embodiments, as part of the call scheduling confirmation, the method causes the endpoint of the call originator to generate an audible hold update providing, for example, an expected indication when the user will be available or, in others, a notification that the call will now be connected. The process proceeds to step 516, and the method 500 displays an augmented communication interface comprising screens enabling the call originator to access contextual information generated and retrieved as already described. The method then proceeds to step 520, and ends.

Figure 6:
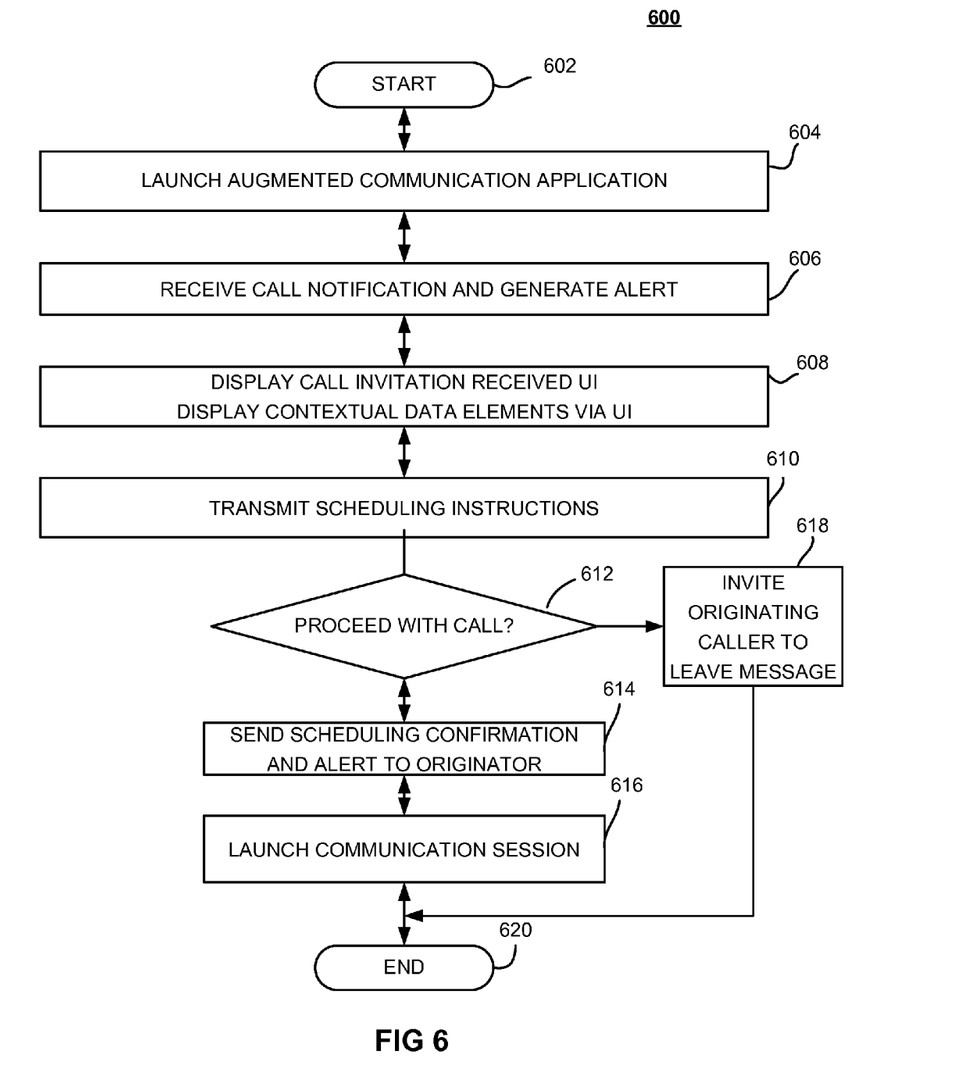
FIG. 6 is a flow diagram depicting the reception and set up of a communication session using a communication endpoint, according to one or more embodiments.

FIG. 6 is a flow diagram depicting a method 600 for the reception and set up of a communication session using a communication endpoint, according to one or more embodiments. The method 600 is started at step 602 and proceeds to step 604 where a locally installed, augmented client communication application is launched, or a browser is opened invoking the functions of the augmented communication application hosted by a server. In some cases, the application may be executing in the background on a recipient endpoint. The method proceeds to step 606, where the method receives a call notification and generates an audible or other alert calling the existence of an inbound call to the intended recipient.

If the intended recipient does not manifest an intent to reject the call, as by pushing a soft button rendered to the display of a Smartphone endpoint, method 600 responds to the call request by proceeding to step 608. At step 608, an augmented user interface is rendered to the display of the recipient endpoint. The augmented user interface displays contextual information retrieved from a data depository. The process proceeds to step 610, wherein the method collects user input from the endpoint and executes scheduling instructions. If the process is being implemented remotely by a server, the instructions are transmitted to a server for execution, otherwise they are locally executed by the locally installed application. The method proceeds to step 612.

At step 612, the method determines whether, as part of augmented call processing, the recipient wishes to proceed with call. If not, the method proceeds to step 618, where it generates and sends to the originator an invitation to leave a message or call back later. The process then terminates at step 620.

If however, the method determines at step 612 that an augmented communication session is to proceed, the method proceeds to step 614. At step 614, the method generates and transmits notification or hold update message to the call originator, instructing the call originator to continue holding with the call to begin momentarily. The process then proceeds to step 616, at which point the communication session is launched and the recipient continues to view an augmented communication display providing access to contextual information generated and retrieved as herein described. The method then proceeds to step 620, and ends.

Figure 7A:
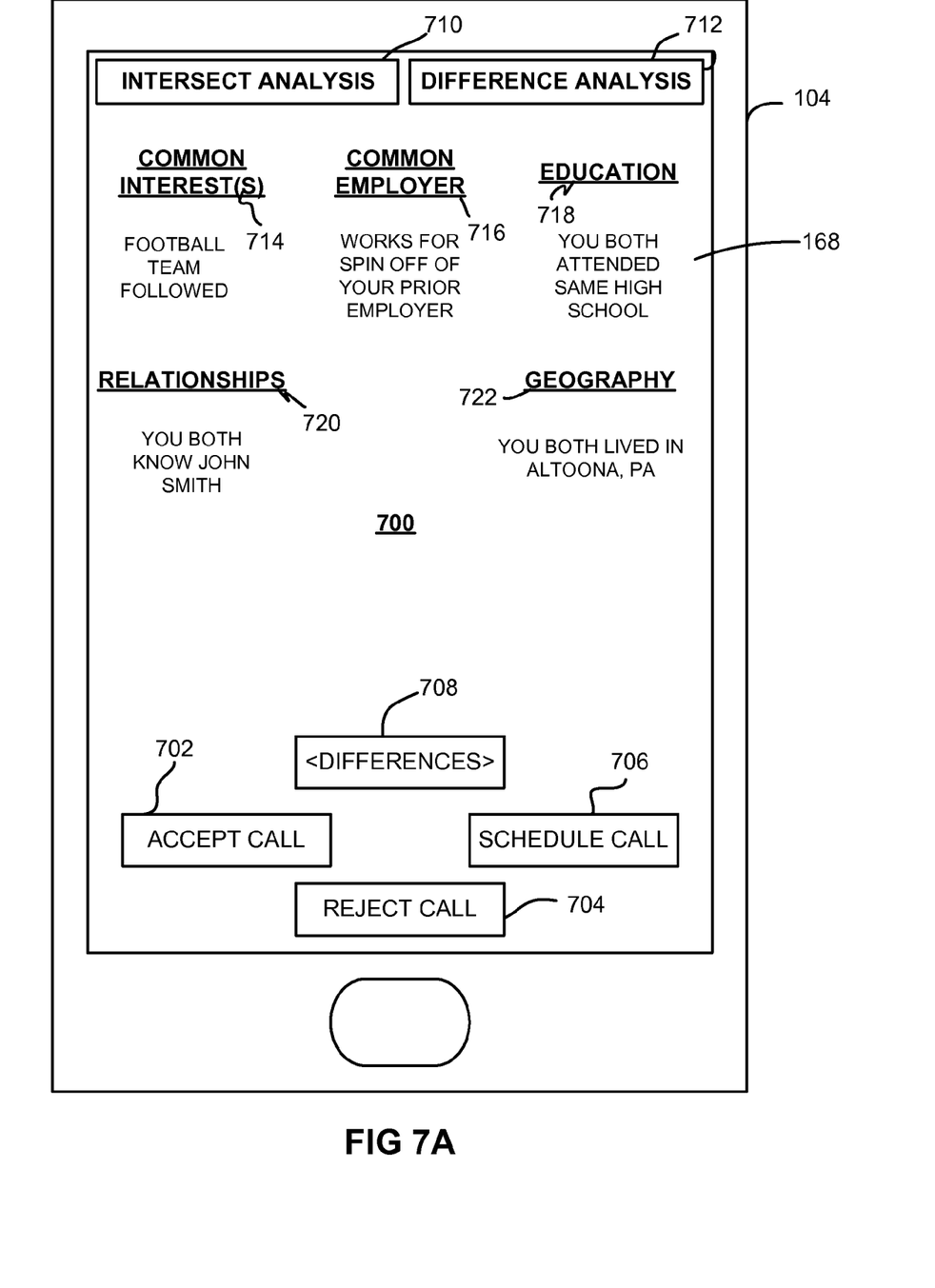
FIGS. 7A-7C collectively illustrate the augmentation of a call set up and completion process utilizing endpoints executing a communication application according to one or more embodiments.
Figure 7B:
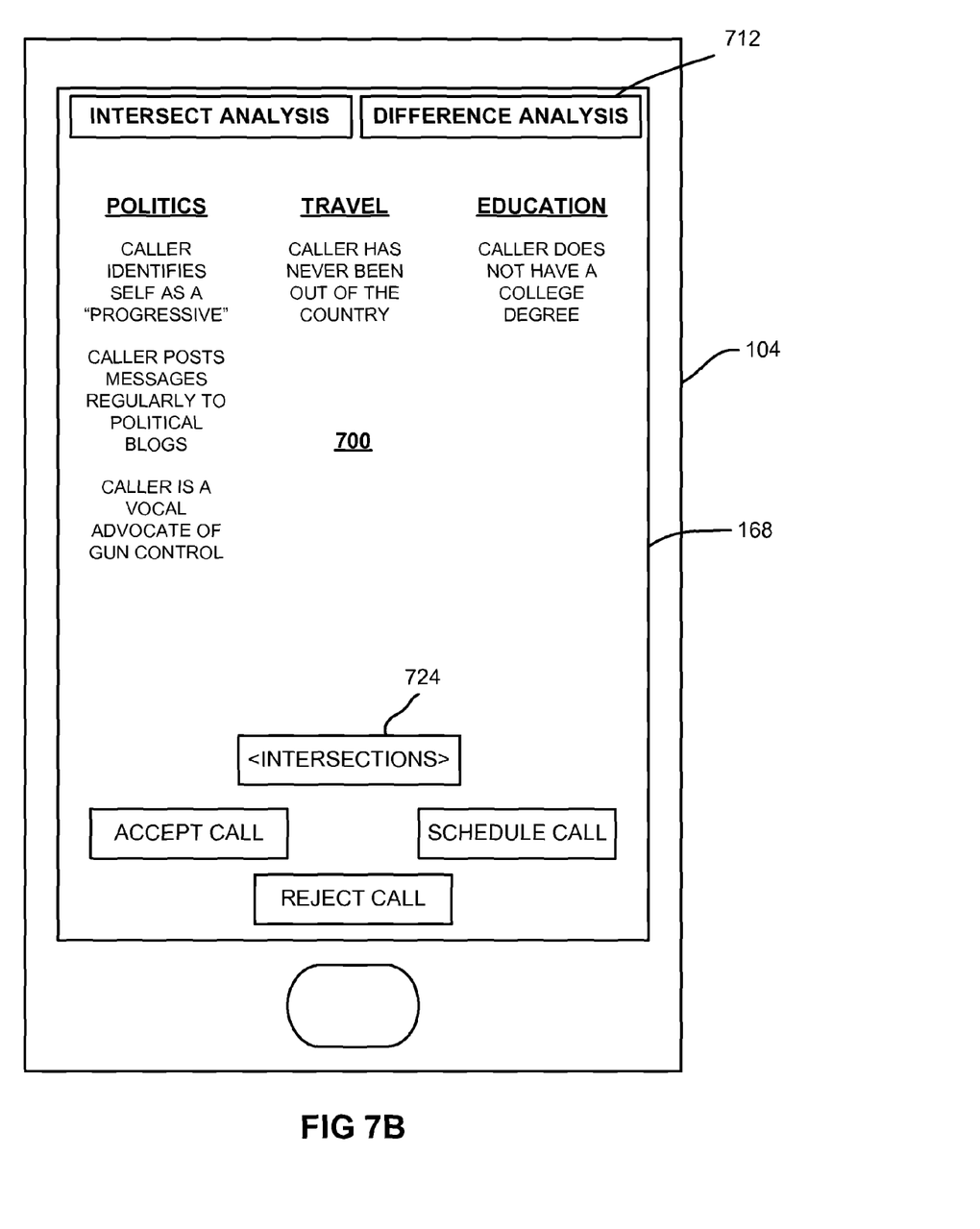
Figure 7C:
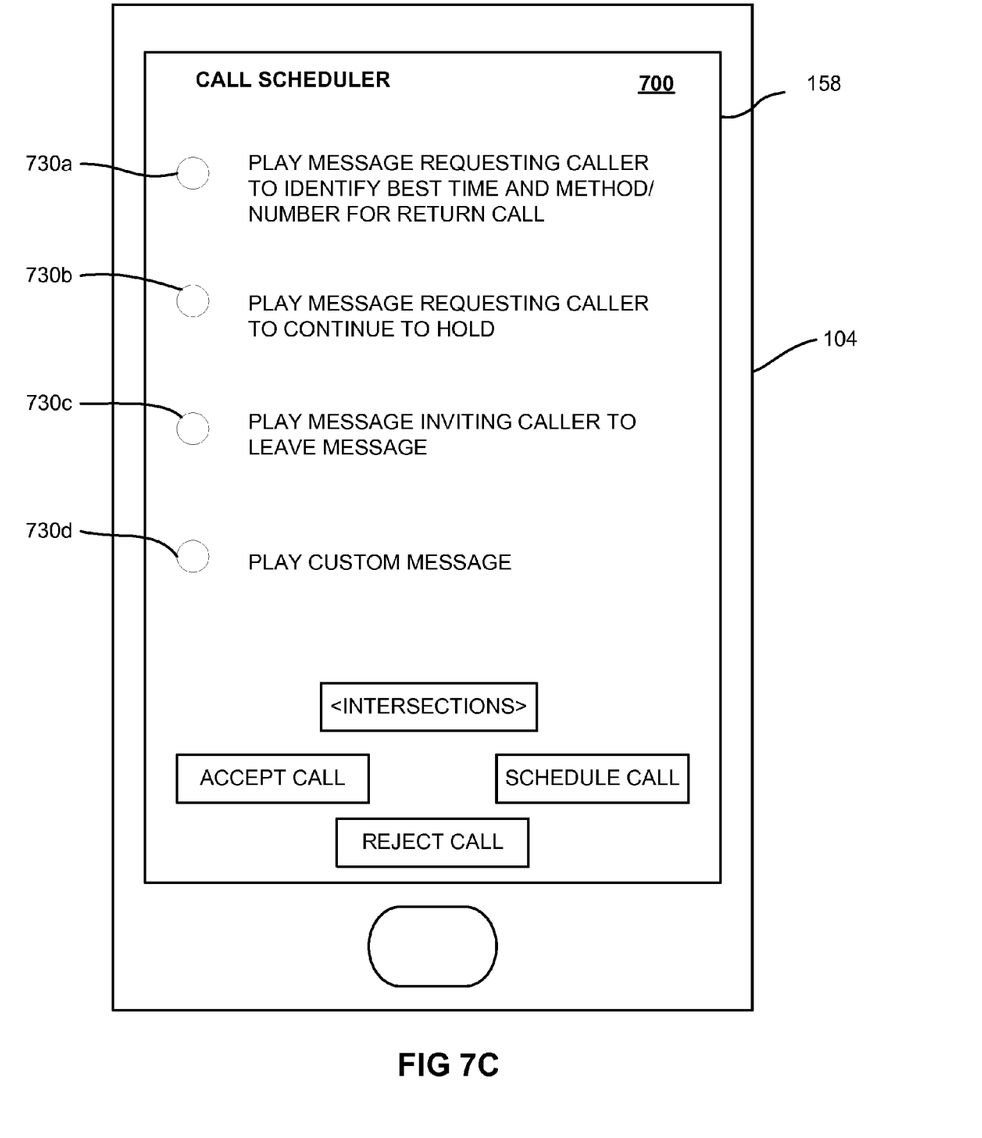

FIGS. 7A-7C collectively illustrates the augmentation of a call set up and completion process according to one or more embodiments. FIG. 7A illustrates a communication interface 700 displayed, upon receipt of a call request notification, on the display 168 of communication terminal (endpoint) 104. Communication terminal, as previously noted, is registered to or otherwise associated with an intended call recipient. The augmented interface of FIG. 7A corresponds to an "intersect analysis" mode of operation and includes a number of soft buttons including an accept call button 702, a reject call button 704, a schedule call button 706, and a "differential analysis" mode select button 708.

In addition to the aforementioned soft buttons, the augmented interface of FIG. 7A further includes mode indicator tabs 710 and 712, as well as object descriptors indicated generally at 714 through 722 for data objects (i.e., the categories of attributes) containing individual attributes common to both the call originator and the intended call recipient. In the example of FIG. 7A, objects representing areas of intersection include sports interests (the contextual data element being a football team followed by both parties), and employment history. In the latter case, a further contextual data element is that the call originator works for a company that is a spin-off of a company for which the intended call recipient once worked. While the two companies are not identical, they are sufficiently related that they might constitute a valuable conversation point or starter between the two parties in, for example, the early stage of a customer-vendor relationship.

Other objects and attributes identified as the result of an intersecting object mode of analysis according to one or more embodiments and exemplified by FIG. 7A include Education (same high school attended), Relationships (common friend), and Geography (same former town of residence).

The augmented interface of FIG. 7B corresponds to a "difference analysis" mode of operation and includes the same accept call button 702, reject call button 704, and schedule call button 706 as shown in FIG. 7A, as well as a "intersect" mode select button 724 by which the user of endpoint 104 can toggle back and forth between the difference and intersect modes. In the differential mode, the display 168 of endpoint 104 identifies those objects and attributes representing points of difference between a caller and call recipient. Just as a call recipient can capitalize on common interests, background, and relationships using a communication interface augmented by data sourced from one or more social networks, so too can the recipient avoid subject matters likely to damage the relationship in some way. Thus, for example, if the call originator is an active poster on a political blog with message activity revealing strong political leanings, a call recipient leaning the other way politically would be guided to steer a conversation to less controversial subjects.

FIG. 7C depicts in exemplary embodiment of a call scheduling function of an augmented communication interface according to embodiments. In FIG. 7C, once the intended call recipient using endpoint 104 has had the opportunity to review contextual information derived from social networking data attributes, the display presents a series of options which range from invite the call originator to leave a message to accept the call.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   receiving a request from a call originator to establish a communication session between the call Originator and an intended call recipient, wherein the request specifies a first unique identifier associated with the call originator and a second unique identifier associated with the intended call recipient;
   initiating to a display of a communication endpoint, responsive to receiving the request, display of contextual information relating the call originator to the intended call recipient, wherein the contextual information identifies at least one of one or more commonalities of interest between the call originator and the intended call recipient, or one or more differences in interest between the call originator and the intended call recipient; and scheduling or establishing the requested communication session.

2. The method according to claim 1, wherein the commonalities or differences include at least one of acquaintances, personal relationships, professional relationships, background interests, skills, expertise, past employers, education history, or hometown.

3. The method according to claim 2, further including a step of deriving the contextual information from attributes retrieved from at least one data repository associated with a social network.

4. The method according to claim 3, wherein the first unique identifier uniquely identifies the call originator to a social network controlling access to a corresponding data repository.

5. The method according to claim 3, wherein the second unique identifier uniquely identifies the intended call recipient to the social network controlling access to a corresponding data repository.

6. The method according to claim 1, further including determining whether contextual information relating the call originator and the intended call recipient resides in an accessible data repository.

7. The method according to claim 6, wherein the scheduling includes, if contextual information already resides in an accessible data repository:

playing an on-hold message for the call originator; and transmitting a pending call notification to a communication endpoint associated with the call originator.

8. The method according to claim 7, wherein the scheduling further includes receiving at least one call processing instruction, and initiating comprises transmitting retrieved contextual information determined to reside in a data repository to a communication terminal associated.

9. The method according to claim 8, wherein the scheduling further includes, if contextual information does not already reside in the data repository:

playing an on-hold message for the call originator;

retrieving data attributes available from at least one social network; and generating the contextual information.

10. The method according to claim 9, wherein the generating includes obtaining contextual data elements by performing at least one of intersect analysis and difference analysis by reference to the retrieved data attributes.

11. The method according to claim 10, wherein at least some of the contextual data elements are generated and stored in a contextual data element repository prior to receiving the request.

12. The method according to claim 6, wherein the scheduling further includes, if contextual information does not already reside in the data repository:

playing an on-hold message for the call originator;

retrieving data attributes available from at least one social network; generating the contextual information.

13. The method according to claim 12, wherein generating the contextual information includes performing at least one of intersect analysis and difference analysis on retrieved data attributes.

14. The method according to claim 12, wherein the scheduling further includes applying a dynamically variable wait time, to received communication requests, according to one of a volume of contextual generated or a volume of contextual information made available to an intended call recipient.

15. A computer implemented method comprising:

receiving a request from a call originator to establish a communication session between the call originator and an intended call recipient, wherein the request specifies a first unique identifier associated with the call originator and a second unique identifier associated with the intended call recipient;

initiating to a display of a communication endpoint, responsive to receiving the request, display of generated contextual information relating the call originator and the intended call recipient; and scheduling the requested communication session, wherein the scheduling includes applying a dynamically variable wait time, to received communication requests, according to one of a volume of contextual information retrieved or a volume of contextual information made available to an intended call recipient.

16. The method of claim 15, further including playing an on-hold message for the call originator; and establishing the requested communication session responsive to an instruction from the communication endpoint.

17. A computer implemented method comprising:

receiving request from a call originator to establish a communication session between the call originator and an intended call recipient, wherein the request specifies a first unique identifier associated with the call originator and a second unique identifier associated with the intended call recipient;

generating contextual information by performing at least one of intersect analysis or difference analysis by reference to retrieved data attributes applicable to one or both of the call originator and the intended call recipient; and initiating to a display of a communication endpoint, responsive to receiving the request, display of the generated contextual information.

18. The method according to claim 17, wherein generating contextual information includes using a distance function to characterize an attribute distance between the call originator and intended call recipient.

19. The method according to claim 18, wherein the attribute distance is graphically represented as the result of the initiating.

20. The method of claim 18, further including:

playing an on-hold message for the call originator; and scheduling the requested communication session.

* * * * *